United States Patent
Thiyagarajan et al.

(10) Patent No.: US 7,853,604 B2
(45) Date of Patent: Dec. 14, 2010

(54) INLINE VIEW QUERY REWRITE USING A MATERIALIZED VIEW

(75) Inventors: Murali Thiyagarajan, Concord, NH (US); Praveen Kumar, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 173 days.

(21) Appl. No.: 11/777,226

(22) Filed: Jul. 12, 2007

(65) Prior Publication Data
US 2009/0019001 A1    Jan. 15, 2009

(51) Int. Cl.
*G06F 17/30* (2006.01)

(52) U.S. Cl. .......................... 707/759; 711/101
(58) Field of Classification Search .......... None
See application file for complete search history.

(56) References Cited

U.S. PATENT DOCUMENTS

| | | | |
|---|---|---|---|
| 5,991,754 A | 11/1999 | Raitto et al. | |
| 6,199,063 B1 | 3/2001 | Colby et al. | |
| 6,334,128 B1 | 12/2001 | Norcott et al. | |
| 6,449,606 B1* | 9/2002 | Witkowski | 707/3 |
| 6,526,403 B1 | 2/2003 | Lin et al. | |
| 6,629,094 B1 | 9/2003 | Colby et al. | |
| 7,599,925 B2 | 10/2009 | Larson et al. | |
| 2004/0122814 A1 | 6/2004 | Zhang et al. | |
| 2006/0122964 A1 | 6/2006 | Yu et al. | |
| 2006/0230017 A1* | 10/2006 | Larson et al. | 707/2 |
| 2006/0271529 A1* | 11/2006 | Dhamija et al. | 707/4 |
| 2009/0228432 A1 | 9/2009 | Thiyagarajan et al. | |

OTHER PUBLICATIONS

Randall G. Bello et al., "Materialized Views in Oracle," Proceedings of the 24th VLDB Conference, New York, USA, 1998, pp. 659-664.
Dr. Lilian Hobbs, "Oracle Materialized View & Query Rewrite," May 2005, pp. 1-25.

* cited by examiner

*Primary Examiner*—Apu M Mofiz
*Assistant Examiner*—Anteneh Girma
(74) *Attorney, Agent, or Firm*—Hickman Palermo Truong & Becker LLP

(57) ABSTRACT

A method allows a query, which contains an inline view, to be rewritten to use a materialized view. The materialized view has an inline view that is equivalent to the inline view of the query. However, the inline view of the materialized view varies textually from the inline view of the query.

18 Claims, 4 Drawing Sheets

INLINE VIEW QUERY REWRITE USING A MATERIALIZED VIEW

TECHNOLOGY

The present invention relates generally to computing queries. More specifically, embodiments of the present invention relate to rewriting queries that contain inline views.

BACKGROUND

Information is conveniently stored in repositories such as databases. Stored information is accessed and updated with applications executing in a database management system (DBMS). A DBMS functions to store and access information in a database in one or more data containers, each of which contains records. The data within each record is organized into one or more attribute fields. Various database architectures exist.

The data containers of relational databases are tables and the records stored therein are rows. The database can contain virtually any number of tables, the attributes of which, are referred to as columns. The data containers of an object oriented database are object classes, the records of which comprise objects, which have attributes referred to as object attributes. Other database architectures also exist. For simplicity and unity herein, a relational database is discussed, solely by way of example.

To retrieve data stored in a database, queries are submitted to a database server, which computes the query and returns the data requested therewith. Query statements submitted to a database server typically conform to syntax characteristic of a particular database language with which the DBMS functions. SQL (Structured Query Language) and PL/SQL (Procedural Language/SQL) are well known examples of such languages. Other database languages, some of them proprietary, are also used. For simplicity and unity, and solely by way of example, SQL statements are discussed herein. Unless otherwise indicated, terms and phrases are used herein in contexts explained in the four paragraphs that follow, below.

Views can allow the results of some queries to be computed more efficiently. The term "view" refers to a predefined query that is treated as a table. A view is thus essentially a virtual table and may be referenced by a database statement as if the view were an actual table. Tables that actually store the data associated with a view are referred to as "base tables." Base tables are referenced, directly or indirectly, by the predefined query. To generate the rows of a view, data is extracted and derived from the base tables. Changing data in a view's base table alters the data that the view shows.

Unless otherwise indicated, the term "Materialized View" (MV) refers to a view for which the results of the predefined query are stored as precomputed values. Materializing Materialized views obviates multiple execution of queries that may require significant time to compute and thus, may allow faster and more efficient access to data. Materialized views are associated with their respective base tables and views with metadata stored in detail tables. Further, materialized views allow queries to be dynamically and transparently rewritten to reference one or more Materialized views in their own base tables, which can boost database performance by allowing faster and more efficient computing of queries. Unless otherwise indicated, the term "query rewrite" herein refers to transforming a SQL query, expressed in terms of tables and views, into a statement that accesses the Materialized views associated with those tables and views, instead. Inline views may be used to facilitate some query rewrites.

Materialized views can contain inline views, which are referred to herein as materialized view inline views. The inline views in a query are referred to herein as query inline views. An inline view essentially functions as a query, itself. Unless otherwise indicated, the phrase "inline view" herein refers to a SELECT statement (e.g., within a query) that is nested inside of another SELECT statement. An inline view essentially comprises an object-like entity, e.g., a query-like object in a base table, that is referred to in the FROM clause of an outer query, and which is created by the complete SELECT statement. Treated in some respects like an object in a base table that is referred to in the FROM clause of the outer query, inline views allow simplification of query constructs and faster and more efficient query computation.

Unlike the base table, other regular tables and named views however, inline views are not true database objects per se. As a consequence, using materialized views to rewrite queries that contain inline views can pose difficulties. For instance, to use an materialized view for rewriting a query that contains an inline view, the inline views in the materialized view should textually match the inline views in a query. In practice, consistent rewriting of queries that have inline views using materialized views has proven virtually impossible to achieve because the probability that queries' inline views will always exactly match the inline views of relevant Materialized views is very low, especially for queries that are received from "third party" (e.g., with respect to the DBMS) applications.

A consistent expectation that a query's inline views will always exactly match the inline views of relevant Materialized views is thus implausible. This is born out in practice, as many, if not most queries with inline views fail to rewrite. The failure of most queries with inline views to rewrite can degrade DBMS performance. For instance, many modern database applications use both inline views and query rewrite for operational efficiency and speed.

An application that uses inline views and query rewrite will likely suffer from missed query rewrite opportunities because of the high probability that its query's inline views will fail to exactly match the inline views of the materialized views textually. When such an application misses a query rewrite opportunity, its query must be computed by accessing base tables and extracting data therefrom rather than with reference to Materialized views, which is generally less efficient than computing the query using an materialized view.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Based on the foregoing, it would be useful to facilitate query rewrite using inline views.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
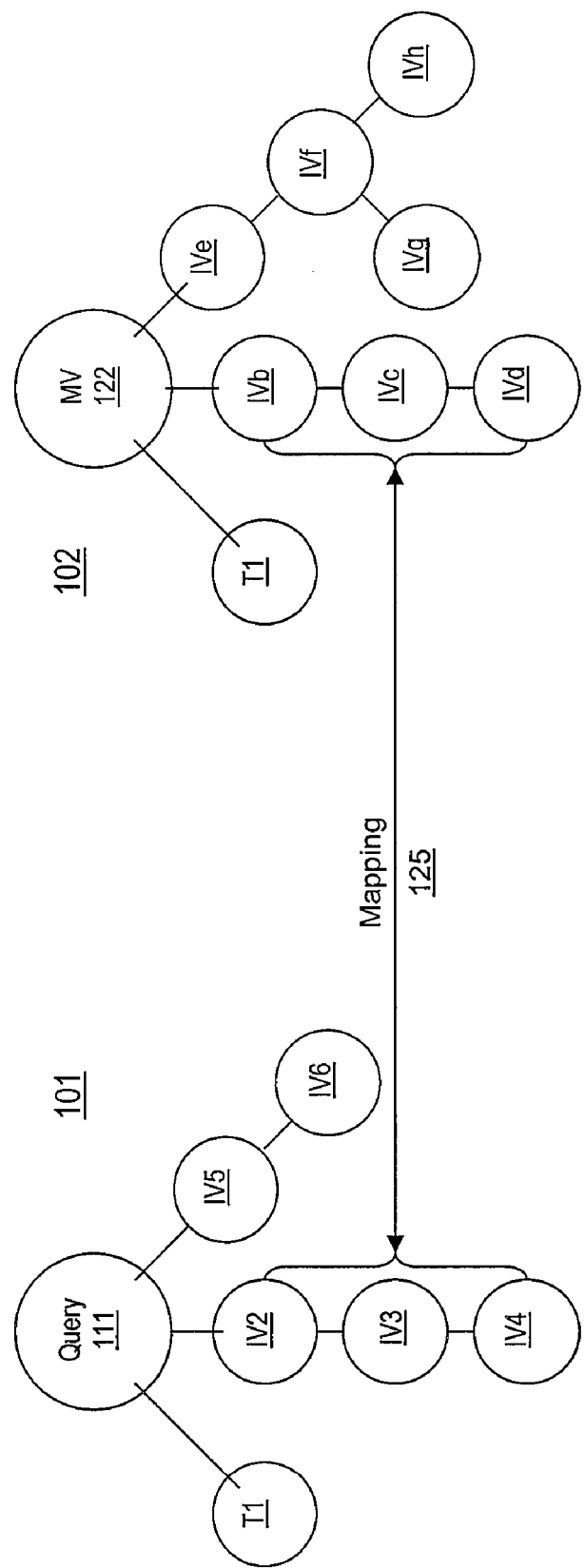
FIGS. 1A and 1B depict example view trees, according to an embodiment of the present invention.

Rewriting queries that contain inline views is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to rewriting queries that contain inline views using materialized views. A query that contains an inline view is rewritten to use a materialized view, which is equivalent to the inline view of the query. However, the inline view of the materialized view varies textually from the inline view of the query. In an embodiment, the inline view of the materialized view does not textually match the inline view of the query.

The example embodiments described herein facilitate query rewrite using inline views. Moreover, the example embodiments may thus enhance performance and efficiency relating to the operation of a DBMS.

Example Procedures

Procedures that may be implemented with an embodiment may be performed with more or less steps than the example steps shown and/or with steps executing in an order that may differ from that of the example procedures. The example procedures may execute on one or more computer systems under the control of machine readable instructions encoded in one or more computer readable storage media.

The example procedures described herein may be performed in relation to rewriting a query that contains an inline view to use a materialized view, which is equivalent to the inline view of the query but in which an inline view of the materialized view varies (e.g., does not match) textually the inline view of the query.

Example embodiments may be implemented with a database management system (DBMS). Embodiments of the present invention are not limited to any particular database architecture. The repository may store a body of records in one or more data containers. A data container may conform to tables in a relational database, a collection of objects (i.e. instances of object classes) in an object oriented database, or the like. The records within the body of records may conform to rows in a table, objects of an object class, or the like. The attributes of the records may conform to columns of the rows of a table, object attributes, or the like. For clarity, simplicity, unity, and brevity of description, the example procedures with be described with reference to a relational database. It should be appreciated however that embodiments are well suited to execution in any kind of database or other information repository architecture.

In an embodiment, a query that contains an inline view is re-written to use a materialized view. The materialized view is equivalent to the inline view of the query, or has an inline view equivalent thereto, but an inline view of the materialized view varies textually the inline view of the query. For instance, the inline view of the materialized view may not textually match the inline view of the query.

In contrast to base tables, other regular tables and named views, inline views may not be treated as true database objects per se, and have thus lacked identifiers such as object numbers. An embodiment of the present invention however assigns an object number or similar identifier to an inline view. Thus, an embodiment treats inline views like other database objects, at least for purposes relating to rewriting queries. Moreover, an embodiment thus allows storage of metadata in association with an identified inline view. Storing metadata in association with an identified inline view facilitates rewriting queries.

When creating a materialized view, inline views thereof are assigned a unique object identifier, such as an object number. In an embodiment, upon rewriting a query containing inline view, object identifiers (e.g., object numbers) are assigned to the inline views of the query, based on the unique object identifiers of equivalent inline views of the materialized view. The assignment of the object identifiers to the inline views of the query during rewrite time is performed upon determining that the inline views of the materialized view and the inline views of the query are equivalent, e.g., semantically.

Inline views of a query and those of a materialized view, upon comparison thereof, are considered to be equivalent to each other upon determining that: (1) their respective 'SELECT' and 'GROUP BY' lists are the same, or under a transitive join condition, equivalent, (2) equivalence exists between their respective 'HAVING' clauses, (3) their 'FROM' clauses contain the same or equivalent objects, and (4) equivalence exists between their respective join graphs, including all of the selections in their respective 'WHERE' clauses.

An example materialized view containing inline views is shown below.

Example Materialized View that Contains Inline Views

```
CREATE MATERIALIZED VIEW SUM SALES_MV
ENABLE QUERY REWRITE AS
SELECT mv_iv.prod_id, mv_iv_.cust_id, sum (mv_iv.amount_sold)
sum_amount_sold
FROM (SELECT prod_id, cust_id, amount_sold
    FROM sales, products
    WHERE sales.prod_id = products.prod_id) MV_IV
GROUP BY mv_iv.prod_id, mv_iv.cust_id;
```

For comparison to the example materialized view containing inline views shown above, an example query containing inline views is shown as follows below.

Example Query that Contains Inline Views

```
SELECT iv.prod_id, iv_.cust_id,
    sum (iv.amount_sold) sum_amount_sold
FROM (SELECT prod_id, cust_id, amount_sold
    FROM sales, products
    WHERE products.prod_id = sales.prod_id) IV
GROUP BY iv.prod_id, iv.cust_id;
```

Upon comparing the example query containing inline views and the example materialized view containing inline views, the selections within the respective 'join' clauses in each of the 'WHERE' clauses do not match textually. For instance, the 'WHERE' clause of the materialized view with inline view reads as shown below.

WHERE sales.prod_id=products.prod_id) MV_IV

In contrast, the 'WHERE' clause of the query with inline view reads as shown below.

WHERE products.prod_id=sales.prod_id) IV

The respective 'join' clauses within the 'WHERE' clauses of the materialized view and the query are thus not textually identical; the columns therein are transposed.

In as much as the inline view of the materialized view and the inline view of the query vary textually, the opportunity for the query to be rewritten would most likely be missed. However, while the materialized view inline view and the query inline view do not match textually, an embodiment of the present invention performs a comparison of a query with inline views to a materialized view with inline views. In comparing the query to the materialized view, equivalence is sought between their respective inline views. An embodiment may seek semantic or similar equivalence between the query inline views and the materialized view inline views, for instance. The components of the query and the materialized view may be parsed for example, to detect whether semantic equivalence between the query inline views and the materialized view inline views exists.

In performing a comparison of the example query and the example materialized view above, an embodiment of the present invention would detect that an equivalence exists between the respective inline views. In the examples above, the selections within the respective 'WHERE' clauses share commutative semantic equivalence. In other words, stating that:

sales.prod_id=products.prod_id as the selections are arranged in the 'WHERE' clause of the materialized view is semantically equivalent to stating that:

products.prod_id=sales.prod_id because of their commutative reflexivity. Embodiments of the present invention use such (and other) equivalences between the respective inline views of materialized views and queries to allow query rewrite using the materialized views to be performed, despite the lack of an exact textual match between them. In addition to commutative equivalence, an embodiment of the present invention seeks other equivalencies that may exist, such as associative and/or distributive equivalence, contextual equivalence and others.

In an embodiment, a textual match may be sought, e.g., initially, between the inline views in materialized views and those of the query. Where a textual match is identified between the inline views in materialized views and those of the query, query rewrite is possible without further search for equivalency. In the absence of a textual match, an embodiment compares the various components of the inline views of a query to identify equivalencies that may exist between the inline views in materialized views and those of the query. In another embodiment, the comparison may be performed without first seeking a textual match.

Upon comparison and finding that equivalence exists between a query inline view and a materialized view inline view, the query inline view is assigned an object identifier, such as an object number, that matches the object identifier of the materialized view inline view, which was assigned thereto upon creating the materialized view. Thus, the query inline view has a unique object identifier that is essentially the same as the object identifier assigned to the materialized view inline view. Now possessing an object identifier, the query inline view is treated, e.g., by the DBMS, as any other database object is treated. Thus, being assigned an object identifier that is the same as that of the corresponding materialized view object, an embodiment of the present invention allows the query can be rewritten.

For query rewrite to proceed, the subordinate set of each object in the query must contain information that corresponds to the materialized view. A database object may have a subordinate set. As used herein, a subordinate set of a particular database object is essentially the set of all the database objects that refer to that particular database object. For a certain materialized view, each and every one of all of the database tables that are referencing its FROM clause are in the subordinate set of that certain materialized view. Similarly, any materialized views that reference one or more base tables of a database are in the subordinate set of each of those base tables. Similarly also, any materialized views referenced by one or more inline views are in the subordinate sets of those inline views.

An inline view itself has a subordinate set. While the inline view initially lacks an object number, the tables referenced by the inline view can be thought of as belong to a subordinate set thereof, which thus includes any materialized views that reference those tables. The subordinate set of an inline view should thus contain any and all of the materialized views that reference that inline view. Each inline view may refer to multiple tables. Each of the multiple tables referenced in the inline view have subordinate sets that contain the materialized views that reference the inline view. Thus, subordinate sets allow efficient loading of the materialized views or other objects referenced by the inline view.

Subordinate set information may thus comprise additional information, that does not necessarily directly reference table definitions, characteristics or the like but rather, references information relating to materialized views that reference the tables. While the inline view thus "obtains" an object number in an embodiment, its object number is used for re-writing queries. In an embodiment, the object number of an inline view is used only for the purpose of query re-write.

In an embodiment therefore, an object identifier assigned to an inline view differs in how it is used from object numbers and other identifiers assigned to other database objects such as tables and base views. In an embodiment, information related to subordinate sets thus comprises additional information that, while not directly representative of table characteristics, definitions or other table information, instead represents something about materialized views, e.g., subordinate information, associated with the tables. The tables are referred to in the materialized view as an inline view. Thus, in an embodiment, the phrase "inline view subordinate set" refers to the subordinate sets of the base tables (or views) of the inline view.

Subordinate sets allow materialized views to be quickly and efficiently identified and located during query rewrite procedures. For instance, upon receiving a query, the query is examined and its inline views are read. Upon reading the query inline views, the subordinate sets thereof are loaded and the materialized views therein are referenced, which contain those inline views. The subordinate sets facilitate query rewrite with a procedure that essentially maps a query inline view to a materialized view inline view on the basis of at least the respective subordinate sets, for instance, mapping matches found there between to one another.

Mapping a query inline view to a materialized view inline view is, in an embodiment, essentially computed analogously to computing subgraph isomorphism. In as much as inline views can be nested arbitrarily, mapping query inline views to materialized view inline views in a manner analogous to computing subgraph isomorphism is essentially NP-complete (non-deterministic polynomial time complete).

Figure 1B:
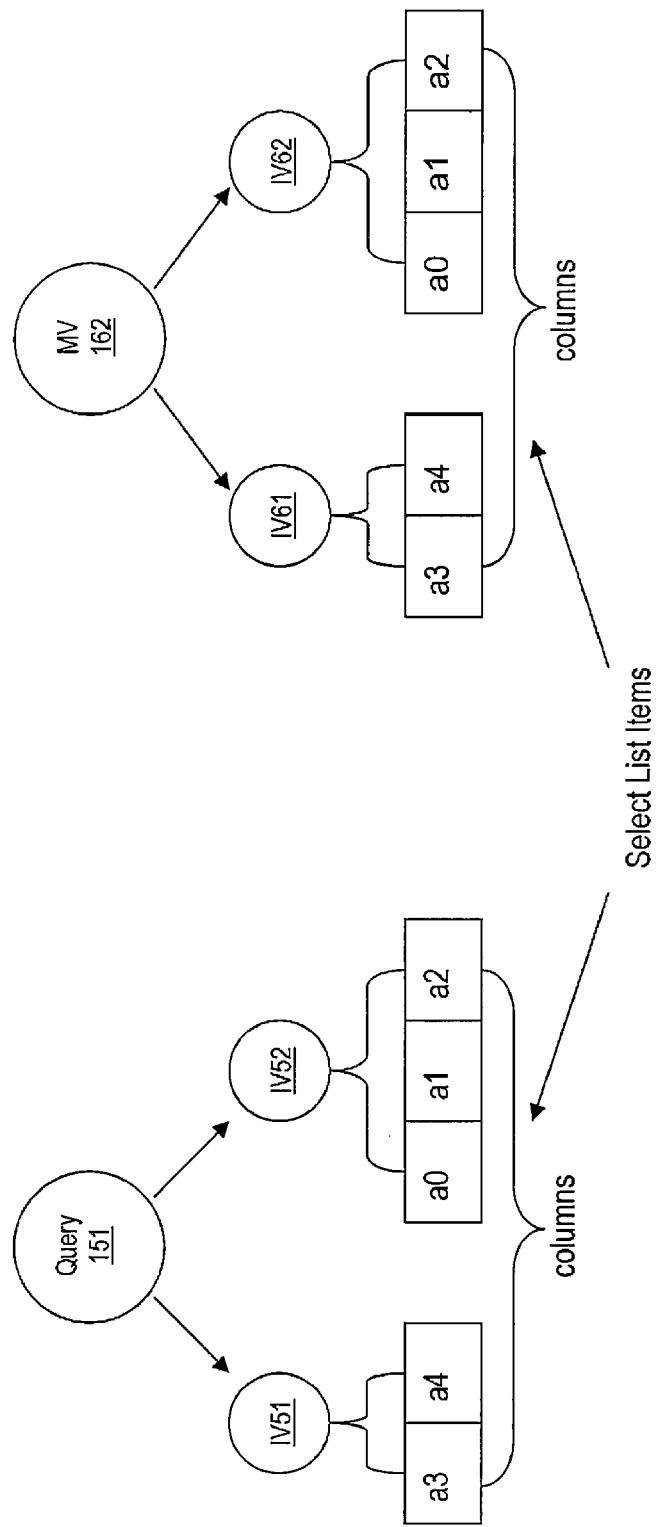

FIGS. 1A and 1B depict example view trees, according to an embodiment of the present invention. Mapping query inline views to materialized view inline views analogously to computing subgraph isomorphism is described with reference to FIG. 1A.

FIG. 1A depicts an example set 100 of view trees. Example query view tree 101 and example materialized view tree 122 can be compared according to an embodiment of the present invention. Query view tree 101 shows that query 111 refers to base table T1. Materialized view 122 refers to base table T1, as well. In addition to base table T1, query 111 has two nested inline views: IV2-IV3-IV4 and IV5-IV6. In addition to base table T1, materialized view 122 has three nested inline view branches: IVb-IVc-IVd, IVe-IVf-IVg and IVe-IVf-IVh.

Query 111 has a breadth of two branches, not including base table T1. One branch of query 111 respectively nests inline views IV2, IV3 and IV4. Inline view IV2 thus has a depth of three inline views. The other branch of query 111 respectively nests inline views IV5 and IV6 and thus has a depth of two views. Both branches of query 111, e.g., inline views IV2 and IV5, have breadths of one.

Materialized view (MV) 122 also has a breadth of two branches, not including base table T1. One branch of materialized view 122 respectively nests inline views IVb, IVc and IVd. Inline view IVb thus has a depth of three views and a breadth of one view. The other branch of materialized view 122 respectively nests inline views IVe and IVf, which then branches into inline views IVg and IVh. Inline view IVe has a depth of three views as well. However, the breadth of inline view IVe is two, because its inline view IVf branches into the two inline views IVg and IVh. Thus, this second branch of materialized view 122 has a depth of three views and a breadth of two views.

In as much as graphing inline views may be computed after a manner similar to that for computing essentially any subgraph, the graph of the inline views can be arbitrarily complex. The distinctions between the respective second branches of query 111 and materialized view 122 essentially illustrate semantic differences between query 111 and materialized view 122. For instance, the distinctions between query 111 and materialized view 122 may illustrate a textual mismatch in the inline views comprising their respective second branches.

Thus, the distinctions between query 111 and materialized view 122 suggest that, using the text-matching approach, the opportunity for query 111 to be rewritten, using materialized view 122, would likely be missed. However, while their respective second branches differ, an embodiment of the present invention performs an essentially subgraph isomorphism based or like comparison of the inline views in the subgraphs of query 111 and the inline views of materialized view 122, in which the respective branches of query 111 and materialized view 122 comprise their respective subgraphs.

In comparing the query to the materialized view, equivalency is sought between the respective subgraphs, which allows mapping of the inline views of query 111 to those of materialized view 122. In performing the subgraph isomorphism like comparison, an embodiment of the present invention ascertains that semantic or similar equivalence exists between inline view IV2 of query 111 and inline view IVb of materialized view 122. An embodiment of the present invention thus maps IV2 of query 111 to inline view IVb of materialized view 122. Mapping IV2 to inline view IVb essentially generates a mapping 125 between the respective first branches of query 111 and of materialized view 122. Mapping IV2 to inline view IVb thus allows query 111 to be rewritten using materialized view 122. While computing a re-write for query 111 is analogous to computing an NP complete problem, an embodiment of the present invention allows the problem to be essentially simplified, e.g., simply taking into account the semantic equivalence between branches IV2 and IVb, using mapping 125.

In an embodiment, information relating to the breadth and/or depth of materialized view inline view tree 102 is stored with the DBMS in metadata associated with the materialized view. These metadata are used in an embodiment to facilitate the comparison of query view tree 101 of to materialized view inline view tree 102. Using these metadata can raise the speed, economy and efficiency of the subgraph isomorphism comparison procedure. For instance, these metadata can be used to allow quick and accurate "pruning" of the "tree space" in computing equivalency, which can further optimize query rewrite. Thus an embodiment of the present invention uses the metadata to essentially identify the materialized views that are to be loaded for re-writing query 111.

In an embodiment, a procedure for re-writing queries uses these metadata. An example of such a procedure is discussed below with reference to FIG. 1B and FIG. 2.

Example Procedure

Figure 2:
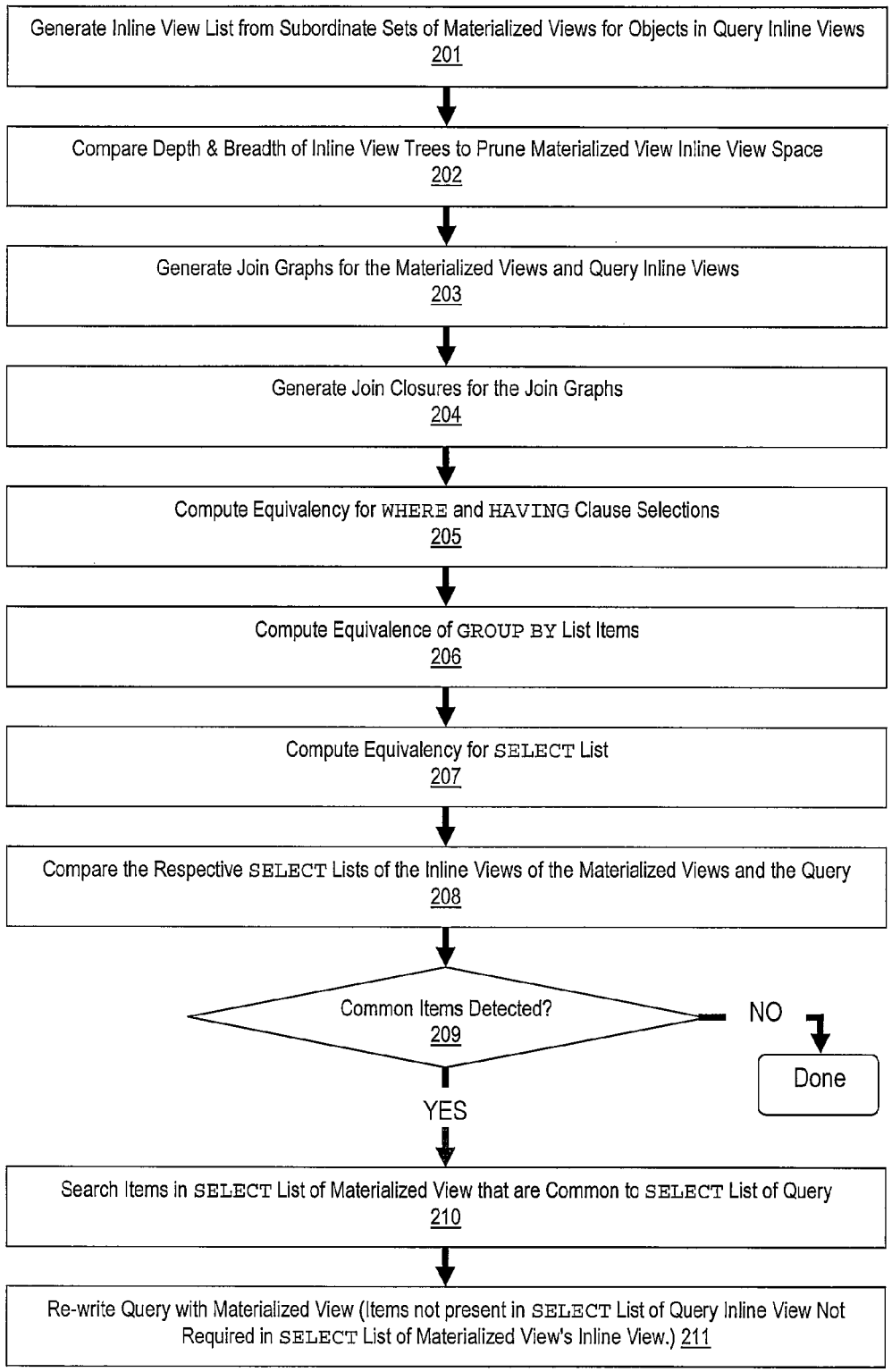
FIG. 2 depicts a flowchart for an example procedure for re-writing a query, according to an embodiment of the present invention.

FIG. 2 depicts a flowchart for an example procedure 200 for re-writing a query, according to an embodiment of the present invention. Upon receipt of a query, in block 201, a list is generated of the inline views from subordinate sets of materialized views for objects associated with the query inline views. For a query that is received and loaded for re-writing, the tables for query inline views are known. From the known tables, the inline views associated therewith are loaded, which use the known base tables, as well as the materialized views that contain the inline views.

In block 202, depth and breadth, stored in an embodiment in metadata, of the inline view trees are compared to prune the inline view space of the materialized views associated therewith. In block 203, join graphs are generated for the inline views of the query and the inline views of the materialized views. Comparing the join graphs allows detection of any semantic and related equivalencies that may be found between them.

In block 204, join closures are generated for the join graphs of the inline views of the query and the inline views of the materialized views. Additional joins may be inferred by the examination of one or more joins of a query, which may complete the join graphs for the inline views associated with both the query and the materialized views.

A containment check may then be performed. For instance, in block 205, equivalency is computed for the WHERE and HAVING clause selections. In block 206, an equivalence of one or more items in the GROUP BY list is computed. In block 207, an equivalence is computed for the SELECT list.

In block 208, the SELECT lists of the materialized view inline view and the query inline views are compared. In block 209, it is determined whether common items are detected in the SELECT lists of the materialized view inline view and the query inline views. If not, procedure 200 is complete without re-writing the query.

However, where it is determined that common items exist in the SELECT lists of the materialized view inline view and the query inline views, then in block 210, items that are present in the SELECT list of the materialized view, which are common to (e.g., also present in) the SELECT list of the query (and in an embodiment, only those common items) are searched. For instance, in a hypothetical situation in which a materialized view's inline view has five (5) items on its SELECT list, e.g., at columns 1, 2, . . . , 5 therein. However, a query's inline view has only three (3) items on its SELECT list, e.g., columns 1, 2 and 3. Thus an embodiment, upon comparing the respective SELECT lists of the materialized view's inline views and the query's inline views, may essentially ignore columns 4 and 5 in the SELECT list of the materialized view's inline view and only search for the three (3) items, e.g., columns 1, 2 and 3, which are common to the SELECT lists of the inline views of both the materialized view and the query. In other words, items "missing" (i.e., with respect to the SELECT list of the materialized view's inline view) from the SELECT list of the query's inline view are not required to be present therein.

With reference to FIG. 1B, the foregoing procedure is described by way of example. FIG. 1B depicts an example set 150 of view trees. An example query 151 and an example materialized view 162 can be compared according to an embodiment of the present invention, e.g., by performing procedure 200 (FIG. 2). Materialized view 162 has two inline views IV61 and IV62. Materialized view inline view IV61 has two columns a3 and a4 as items in its SELECT list. Materialized view inline view IV62 has three columns a0, a1 and a2 as items in its SELECT list.

Query 151 has two inline views IV51 and IV52. Query inline view IV51 has two columns a3 and a4 as items in its SELECT list. Query inline view IV52 has three columns a0, a1 and a2 as items in its SELECT list. The inline views of both query 151 and materialized view 162 are defined on the same table, e.g., Table 'a'. Inline view IV51 has subordinate sets that contain both inline view 61 and inline view 62, because both inline views IV51 and IV52 of query 151 reference the same base table 'a' as do the inline views 61 and 62 of materialized view 162. Initially, it is not known which of the inline views IV61 or IV62 of the materialized view 162 will match with which of the inline views IV51 or IV52 of query 151.

As query 151 is to be re-written, its inline views 51 and 52 are considered in sequence. As inline view 51 is considered, its subordinate sets are loaded. Upon loading the subordinate sets of inline view 51, the inline views 61 and 62 of materialized view 162 are noticed to be present therewith, as they both reference the same base table 'a'. In an embodiment, general inline view query re-write of query 151 is performed. During general inline view query re-write, comparison of the select lists of the inline views 51 and 52 resolve inline view 51 of query 151 to inline view 61 of materialized view 162, as they both contain the equivalent SELECT list items, a3 and a4.

On the basis of this equivalence, an object identifier (such as an object number) associated with the inline view IV51 of materialized view 162 is assigned to the inline view 151 of the query 151. Likewise, inline view IV52 of query 151 may be mapped to inline view 62 of materialized view 162 and may be assigned an object identifier associated therewith.

Example Computer System Platform

Figure 3:
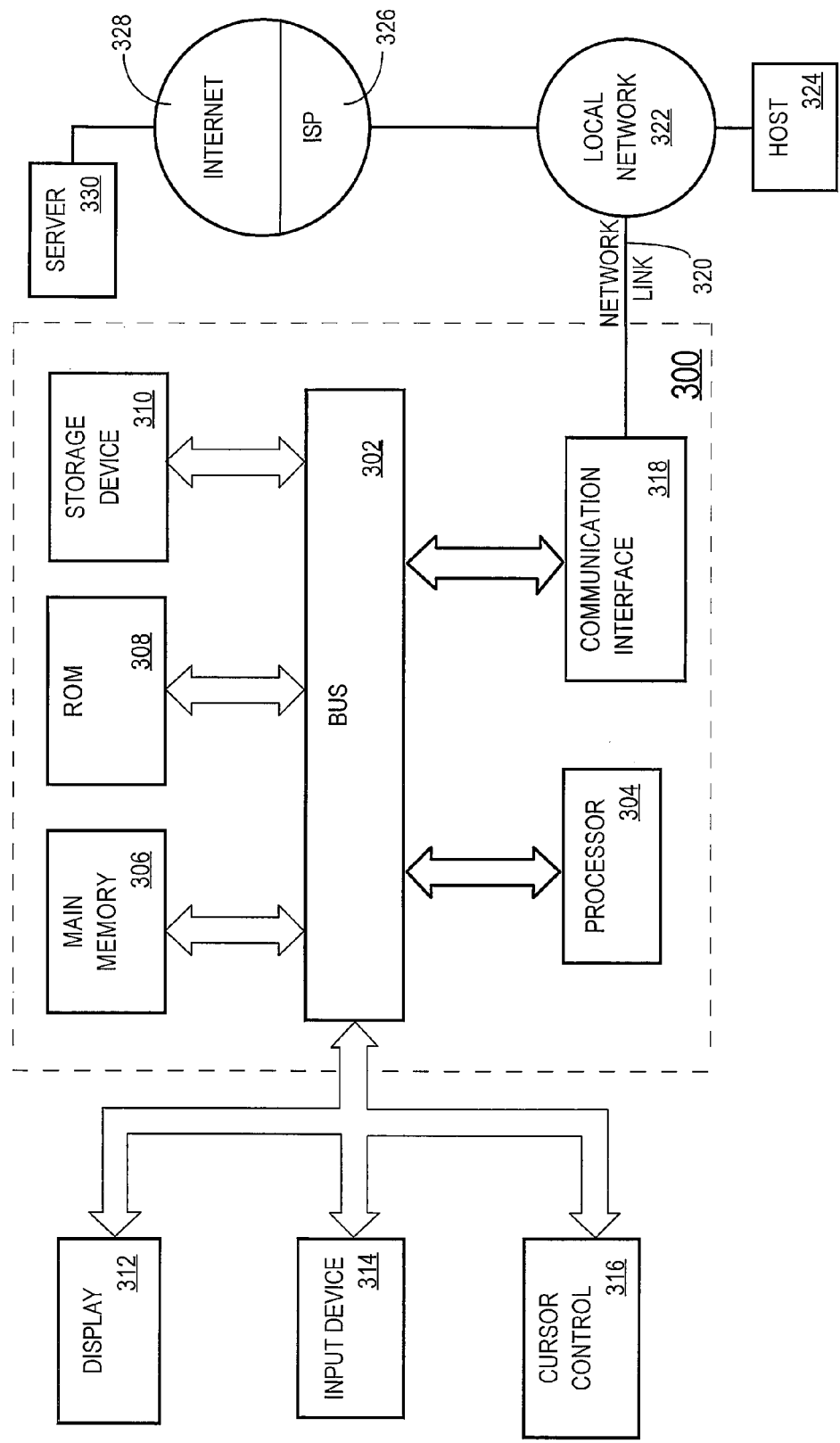
FIG. 3 depicts an example computer system platform, with which an embodiment of the present invention may be practiced.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), cathode ray tube (CRT) or the like, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for general inline view query re-write, as described above. According to one embodiment of the invention, [XXX] is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes or portions of various reflectivity, absorbance or the like, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a digital subscriber line (DSL), cable or other modem to provide a data communication connection to a corresponding type of telephone line a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for general inline view query re-write, as described herein. The received code may be executed by processor 304 as it is received, and/or stored in storage device 310, or other non-volatile storage for later execution. In this manner, computer system 300 may obtain application code in the form of a carrier wave.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    making a determination to rewrite a query that contains an inline view to use a materialized view which has an inline view;
    wherein making a determination includes:
        accessing database metadata that defines said materialized view and said inline view of said materialized view as separate database objects, wherein said database metadata includes a materialized view definition describing characteristics of said materialized view and a separate inline view definition describing characteristics of said inline view of said materialized view;
        based on the separate inline view definition, determining that said inline view of the materialized view and said inline view of the query are equivalent;
        wherein the inline view of the materialized view varies textually from the inline view of the query;
        wherein the inline view of the materialized view comprises an expression that defines a query statement and is not a named view or tablet; and
    in response to making said determination to rewrite a query that contains an inline view to use a materialized view, rewriting said query to use said materialized view; and
    wherein the method is performed by one or more computing devices.

2. The method as recited in claim 1 wherein the inline view of the materialized view is identified by an object identifier, unique from an object identifier associated with other database objects and said materialized view; and
    wherein the unique object identifier of the inline view of the materialized view is assigned thereto upon creation of the materialized view.

3. The method as recited in claim 2 wherein rewriting the query comprises the steps of:
    assigning an object identifier to the query inline view wherein the query inline view object identifier is assigned based on the unique object identifier of the materialized view inline view;
    wherein, upon assigning the object identifier to the query inline view based on the unique object identifier of the materialized view inline view, the query inline view is handled as a database object.

4. The method as recited in claim 1 wherein the comparing step comprises:
comparing a 'SELECT', 'FROM' clause and join graph of the query inline view to a 'SELECT', 'FROM' clause and join graph of the materialized view inline view.

5. The method as recited in claim 1 wherein the determining step comprises determining that at least one of the following:
the 'SELECT' and 'GROUP BY' lists of the query inline view and of the materialized view inline view are equivalent or, under a transitive join condition, identical;
the 'FROM' clauses of the query inline view and of the materialized view inline view comprise equivalent or identical objects;
the 'HAVING' clauses of the query inline view and of the materialized view inline view are equivalent; and
the join graphs, including all selections in 'WHERE' clauses thereof, of the query inline view and of the materialized view inline view are equivalent.

6. The method as recited in claim 5 wherein determining that the join graphs are equivalent comprises:
mapping the query inline view to the materialized view inline view.

7. The method as recited in claim 6 wherein mapping the query inline view to the materialized view inline view comprises:
accessing metadata corresponding to the materialized view;
extracting from the materialized view metadata at least one of breadth and depth information relating to inline view trees of the materialized view;
generating a list, from one or more subordinate sets of the materialized view, of materialized view inline views for objects in the query inline views;
comparing the breadth and depth information of the materialized view inline view trees;
generating a join graph for the materialized view inline view and a join graph for the query inline view; and
comparing the join graphs of the materialized view inline view and the query inline view.

8. The method as recited in claim 7 wherein comparing the join graphs of the materialized view inline view and the query inline view comprises:
generating join closures for the join graphs of the materialized view inline view and the query inline view.

9. The method as recited in claim 3, further comprising the step of:
attempting to textually match the inline views of the query inline view and of the materialized view inline view;
wherein the attempting step is performed prior to determining that said inline view of the materialized view and said inline view of the query are equivalent; and
wherein at least the determining step is performed upon failing to textually match the inline views of the query inline view and of the materialized view inline view.

10. A computer-readable storage medium having instructions encoded therewith, which, when executed with one or more processors of a computer system, cause the processors to perform:
making a determination to rewrite a query that contains an inline view to use a materialized view which has an inline view;
wherein making a determination includes:
accessing database metadata that defines said materialized view and said inline view of said materialized view as separate database objects, wherein said database metadata includes a materialized view definition describing characteristics of said materialized view and a separate inline view definition describing characteristics of said inline view of said materialized view;
based on the separate inline view definition, determining that said inline view of the materialized view and said inline view of the query are equivalent;
wherein the inline view of the materialized view varies textually from the inline view of the query;
wherein the inline view of the materialized view comprises an expression that defines a query statement and is not a named view or table and
in response to making said determination to rewrite a query that contains an inline view to use a materialized view, rewriting said query to use said materialized view; and
wherein the method is performed by one or more computing devices.

11. The computer-readable storage medium as recited in claim 10, wherein the inline view of the materialized view is identified by an object identifier, unique from an object identifier associated with other database objects and said materialized view; and
wherein the unique object identifier of the inline view of the materialized view is assigned thereto upon creation of the materialized view.

12. The computer-readable storage medium as recited in claim 10, wherein the instructions that cause rewriting the query comprise instructions that cause:
assigning an object identifier to the query inline view wherein the query inline view object identifier is assigned based on the unique object identifier of the materialized view inline view;
wherein, upon assigning the object identifier to the query inline view based on the unique object identifier of the materialized view inline view, the query inline view is handled as a database object.

13. The computer-readable storage medium as recited in claim 10, wherein the instructions that cause comparing comprise instructions that cause:
comparing a 'SELECT', 'FROM' clause, and join graph of the query inline view to a 'SELECT', 'FROM' clause and join graph of the materialized view inline view.

14. The computer-readable storage medium as recited in claim 10, wherein the instructions that cause determining comprise instructions that cause determining that at least one of the following:
the 'SELECT' and 'GROUP BY' lists of the query inline view and of the materialized view inline view are equivalent or, under a transitive join condition, identical;
the 'FROM' clauses of the query inline view and of the materialized view inline view comprise equivalent or identical objects;
the 'HAVING' clauses of the query inline view and of the materialized view inline view are equivalent; and
the join graphs, including all selections in 'WHERE' clauses thereof, of the query inline view and of the materialized view inline view are equivalent.

15. The computer-readable storage medium as recited in claim 14, wherein the instructions that cause determining that the join graphs are equivalent comprise instructions that cause:
mapping the query inline view to the materialized view inline view.

16. The computer-readable storage medium as recited in claim 15, wherein the instructions that cause mapping the query inline view to the materialized view inline view comprise instructions that cause:

accessing metadata corresponding to the materialized view;

extracting from the materialized view metadata at least one of breadth and depth information relating to inline view trees of the materialized view;

generating a list, from one or more subordinate sets of the materialized view, of materialized view inline views for objects in the query inline views;

comparing the breadth and depth information of the materialized view inline view trees;

generating a join graph for the materialized view inline view and a join graph for the query inline view; and comparing the join graphs of the materialized view inline view and the query inline view.

17. The computer-readable storage medium as recited in claim 16, wherein the instructions that cause comparing the join graphs of the materialized view inline view and the query inline view comprise instructions that cause:

generating join closures for the join graphs of the materialized view inline view and the query inline view.

18. The computer-readable storage medium as recited in claim 12, the instructions further comprising instructions that cause:

attempting to textually match the inline views of the query inline view and of the materialized view inline view;

wherein the attempting step is performed prior to determining that said inline view of the materialized view and said inline view of the query are equivalent; and wherein at least the determining step is performed upon failing to textually match the inline views of the query inline view and of the materialized view inline view.

* * * * *

UNITED STATES PATENT AND TRADEMARK OFFICE
CERTIFICATE OF CORRECTION

PATENT NO.        : 7,853,604 B2
APPLICATION NO.   : 11/777226
DATED             : December 14, 2010
INVENTOR(S)       : Murali Thiyagarajan et al.

It is certified that error appears in the above-identified patent and that said Letters Patent is hereby corrected as shown below:

In column 12, line 45, in claim 1, delete "tablet;" and insert -- table; --.

Signed and Sealed this
Ninth Day of August, 2011

David J. Kappos
*Director of the United States Patent and Trademark Office*